Patented Dec. 12, 1933

1,939,593

UNITED STATES PATENT OFFICE 1,939,593

DYESTUFF FOR ARTIFICIAL SILK AND PROCESS OF MAKING THE SAME

Henry R. Lee, South Milwaukee, and Edwin C. Buxbaum, Shorewood, Wis., assignors to E. I. du Pont de Nemours & Company, Wilmington, Del., a corporation of Delaware No Drawing. Application October 7, 1931
Serial No. 567,470

8 Claims. (Cl. 260—60)

This invention relates to novel dyestuffs for artificial silk. More particularly, this invention deals with dyestuffs of the 1,4-diamino-anthraquinone series.

It is an object of this invention to produce novel dyestuffs of the anthraquinone series adapted to dye cellulose ester material in red-violet shades. Other and further important objects of the invention will become apparent as the description proceeds.

In British Patent No. 291,814 (accepted June 13, 1928) there is described a process whereby 1,4-dimethyl-diamino-anthraquinone is heated with sulfuric acid monohydrate at 180–220° C., or else with sulfuric acid and boric acid at 130° C., whereby partial demethylation of the dyestuff occurs, and a dyestuff results, dyeing acetate silk in bright blue-violet shades. We have now found that if the above process be carried out in the presence of mercury, the resultant dyestuff dyes acetate silk in bright bluish-red shades. Apparently, the presence of mercury causes the demethylation to proceed considerably further than in the case where no mercury is used; in fact, complete demethylation may be brought about by our improved process. Nevertheless, the resulting material dyes artificial silk in considerably bluer and brighter shades than 1,4-diamino-anthraquinone prepared directly by known methods.

The explanation of the latter phenomenon is not clearly understood. It is possible that the product of our improved process contains some 1-amino-4-methyl amino-anthraquinone which influences the shade of the product and distinguishes it from both 1,4-diamino-anthraquinone and 1,4-dimethyldiamino-anthraquinone. However, such hypothesis is based solely upon theory, and should not be construed as limiting our invention.

Although we expressed the opinion above that our process is probably a demethylation reaction, carried to a further degree than in British Patent 291,814, the same result cannot apparently be duplicated by intensifying the reacting conditions of the British patent. Thus, the use of oleum instead of sulfuric acid monohydrate in the process of said British patent results in sulfonation. (British Patent 15,355 of 1908). The use of increased temperatures or prolonging the time of action results in decomposition of the anthraquinone body.

The use of mercury on the other hand, renders the process very flexible, and enables one to carry the demethylation to any desired degree by proper control of the temperature, duration of the reaction, or strength of the acid. In this fashion reddish-violet dyestuffs may be produced, ranging in shade from the blue-violet of the British patent to the bright bluish-red of the completely demethylated product.

In our improved procedure it is not necessary to use sulfuric acid monohydrate, since the reaction proceeds with concentrated sulfuric acid of less strength, for instance, 78–93% sulfuric acid.

Without limiting our invention to any specific procedure, the following examples are given to illustrate our preferred mode of carrying out the same. Parts given are parts by weight.

*Example 1*

100 parts of leuco-1,4-dimethyl-diamino-anthraquinone are mixed with 900 parts of sulfuric acid (93%) in which have been dissolved 4 parts of mercuric sulfate. The reaction mixture is heated with agitation at 175–180° C. for eight hours. The color of the reaction mixture remains brown, and the reaction is regarded as finished when a drop of the reaction mixture in alcohol gives a bright bluish-red color. The dyestuff is isolated by pouring into 6000 parts of cold water, followed by filtration of the precipitate, which is then washed acid free with warm water. The product dyes acetate silk in bright bluish-red shades of excellent fastness to light.

*Example 2*

100 parts of 1,4-dimethyl-diamino-anthraquinone are mixed with 800 parts of 93% sulfuric acid in which have been dissolved 4 parts of mercuric chloride. The reaction mixture is heated to about 175° to 200° C. for 6 hours. The reaction is considered as finished when a drop of the reaction mixture in alcohol gives a bright bluish-red color. The dyestuff is isolated by pouring into 6000 parts of cold water, followed by filtration of the precipitate, which is then washed acid free with warm water. The product dyes acetate silk in bright bluish-red shades of excellent fastness to light and is identical with the product of Example 1.

*Example 3*

100 parts of 1,4-dimethyl-diamino-anthraquinone or the corresponding leuco compound are mixed with 1000 parts of sulfuric acid monohydrate in which have been dissolved 3 parts of mercury. The reaction mixture is heated to 175–180° C. for eight hours and the product is isolated as in Example 1. The product is identical with that produced in Examples 1 and 2.

Example 4

100 parts of 1,4-dimethyl-diamino-anthraquinone or its leuco compound are mixed with 1000 parts of 78% sulfuric acid in which have been dissolved 4 parts of mercuric sulfate. The reaction mixture is heated to 180–190° C. for 12 hours and then isolated in the usual manner. The product is identical with that produced in Examples 1, 2 or 3.

Example 5

100 parts of 1,4-dimethyl-diamino-anthraquinone or its leuco compound are mixed with 800 parts of 93% sulfuric acid in which have been dissolved 4 parts of mercuric sulfate. The reaction mixture is heated to 175–180° C. for four hours and then isolated in the usual manner. The product dyes acetate silk in a shade which can be described as purple, and which is much redder than the product of British Patent No. 291,814, but not so red as the product obtained by Examples 1, 2 or 3. Its fastness to light is excellent.

It will be understood that many variations are possible in our procedure without departing from the spirit of the same. For instance, the temperature may vary from 150° C. and upwards, although the higher temperatures, up to about 200° C. are to be preferred. The concentration of the acid may vary within wide limits; 90–100% are concentrations to be preferred. Boric acid may be added without affecting the product. Other compounds of mercury than the sulfate, or even elemental mercury, may be used.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. The process of producing dyestuffs for cellulose acetate, which comprises heating a compound selected from the group consisting of 1,4-dimethyl-diamino-anthraquinone and leuco-1,4-dimethyl-diamino-anthraquinone with sulfuric acid of 78 to 100% strength in the presence of a catalyst selected from the group consisting of mercury and inorganic compounds thereof.

2. The process of producing dyestuffs for cellulose acetate, which comprises heating 1,4-dimethyl-diamino-anthraquinone with sulfuric acid of 78 to 100% strength in the presence of a catalyst selected from the group consisting of mercury and inorganic compounds thereof.

3. The process of producing dyestuffs for cellulose acetate, which comprises heating leuco-1,4-dimethyl-diamino-anthraquinone with sulfuric acid of 78 to 100% strength in the presence of a catalyst selected from the group consisting of mercury and inorganic compounds thereof.

4. The process of producing dyestuffs for cellulose acetate, which comprises heating a compound selected from the group consisting of 1,4-dimethyl-diamino-anthraquinone and leuco-1,4-dimethyl-diamino-anthraquinone with sulfuric acid of 90 to 100% strength at 150 to 200° C. in the presence of a catalyst selected from the group consisting of mercury and inorganic compounds thereof.

5. The process of producing a dyestuff for cellulose acetate, which comprises heating 1,4-dimethyl-diamino-anthraquinone in sulfuric acid of 93–100% strength, at a temperature of 175–200° C. in the presence of a mercuric salt for a period of four to eight hours.

6. The process of producing a dyestuff for cellulose acetate, which comprises heating leuco 1,4-dimethyl-diamino-anthraquinone in sulfuric acid of 93–100% strength, at a temperature of 175–200° C. in the presence of a mercuric salt for a period of about eight hours.

7. A dyestuff for cellulose acetate material comprising demethylated 1,4-dimethyl-diamino-anthraquinone, and characterized by dyeing acetate silk in reddish-violet shades of redder shades than the product obtainable by heating 1,4-dimethyl-diamino-anthraquinone with sulfuric acid monohydrate for 1 hour at 180–220° C., but of bluer shade than 1,4-diamino-anthraquinone.

8. A dyestuff for cellulose acetate material substantially identical with the product obtainable by heating leuco-1,4-dimethyl-diamino-anthraquinone with 93% sulfuric acid at a temperature of 180° C. for 8 hours and in the presence of mercuric sulfate.

HENRY R. LEE.
EDWIN C. BUXBAUM.